(12) United States Patent
Case

(10) Patent No.: US 6,434,560 B1
(45) Date of Patent: Aug. 13, 2002

(54) METHOD FOR ACCELERATED SORTING BASED ON DATA FORMAT

(75) Inventor: Douglas Robert Case, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/356,935

(22) Filed: Jul. 19, 1999

(51) Int. Cl.$^7$ ............................................. G06F 17/30
(52) U.S. Cl. .......................................... 707/7; 707/204
(58) Field of Search ........................... 707/7, 101, 202, 707/204, 526, 513

(56) References Cited

U.S. PATENT DOCUMENTS

| | | | | |
|---|---|---|---|---|
| 4,086,628 A | | 4/1978 | Woodrum | 707/7 |
| 5,193,207 A | * | 3/1993 | Vander Vegt et al. | |
| 5,204,967 A | * | 4/1993 | Armstrong | |
| 5,551,018 A | | 8/1996 | Hansen | 707/7 |
| 5,563,997 A | * | 10/1996 | Fisher | |
| 5,604,851 A | * | 2/1997 | Taylor | |
| 5,615,366 A | | 3/1997 | Hansen | 707/7 |
| 5,634,009 A | | 5/1997 | Iddon et al. | 709/223 |
| 5,813,004 A | * | 9/1998 | Meck et al. | 707/7 |
| 5,960,435 A | * | 9/1999 | Rathmann et al. | 707/101 |
| 6,035,296 A | * | 3/2000 | Fushinmi | 707/7 |
| 6,199,064 B1 | * | 3/2001 | Schindler | 707/7 |

FOREIGN PATENT DOCUMENTS

| | | |
|---|---|---|
| JP | 60-168261 | 8/1985 |
| JP | 01-114939 | 10/1989 |
| JP | 05-303484 | 11/1993 |
| JP | 10-228384 | 8/1998 |
| WO | WO 98/29835 | 7/1998 |

OTHER PUBLICATIONS

Brigner, P., "Creating Signed, Persistant Java Applets", Dr. Dobb's Journal, vol. 24, No. 2, 82, 84–88, Feb. 1999 (Abstract only 1pp.).
Gustavson, R., "CGI–ROM: Servers on a Disc and Other Web/CD Intersections", Emedia Professional, vol. 11, No. 3, pp. 43–44, 46–48, 50, 52, Mar. 1998 (Abstract only 1pp.).
Gulesian, M., "Plugging into the Web", DBMS, vol., 9, No. 13, pp. 69–70, 72, Dec. 1996 (Abstract only 1pp.).
Kostler, G. et al., "Client–server Optimization for Multimedia Document Exchange", Database Systems for Advance Applications '97. Proceedings of the Fifth International Conference, pp. 135–144, Published: Singapore, 1997, xvii+ 542pp (Abstract only 1pp.).
Robicheaux, M., "Client/Server/Web: Extending Your Reach", Object Magazine, pp. 51–53, Jul. 1996 (Abstract only 1pp.).
Law, KCK et al., "Web–Enabling Legacy Applications", Proceedings 1998 International Conference on Parallel and Distributed Systems (Cat. No. 98TB100250), pp. 218–225 IEEE Computer Soc. (Abstract only 1pp.).

(List continued on next page.)

Primary Examiner—Jean M. Corrielus
Assistant Examiner—Tam Nguyen
(74) Attorney, Agent, or Firm—Gates & Cooper LLP

(57) ABSTRACT

A method for accelerated sorting of data based on data format, wherein the format is determined from known, derived or empirical characteristics indicating whether the data is an unordered format, a partially ordered format, or a fully ordered format. Information used in making these determinations may include the receipt of an indicator from the sending process (e.g., indicating the type of platform used by the sending process, the type of sending process, the type of data transmitted by the sending process, etc.), or the received data itself, or a tracing or trending analysis performed on the received data, or some other information. When such situations are recognized, the receiver process alters its processing, so that more efficient sorting methods are selected and used, or so that no sorting is performed.

33 Claims, 2 Drawing Sheets

OTHER PUBLICATIONS

Bisson, S., "Making an ASP of Yourself", Application Development Advisor, vol. 1 No. 5, 62, 64–65, May–Jun. 1998 (Abstract only 1pp).

Hu, JC et al., "Measuring the Impact of Event Dispatching and Concurrency Models on Web Server Performance Over High–speed Networks", Dept. of Computer Sci., Washington Univ., St. Louis, MO, USA, GLOBECOM 97. IEEEE Global Telecommunications Conference, Conference Record, (Cat No. 97CH36125), Pt. vol. 3, pp. 1924–1931, 1997, (Abstract only 1pp.).

Dreher C., "A Client–side Save Method in Java", WEB Techniques, vol. 3, No. 2, pp. 67–71, Feb. 1998 (Abstract only 1pp.).

Carroll E et al., "Database Programming with JDBC", WEB Techniques, vol. 1, No. 7, pp. 45–46, 48–50, Oct. 1996, (Abstract only 1pp.).

Oney W, "Porting from DOS to windows", Dr. Dobb's Journal, vol. 19, No. 3, pp. 82, 84–85, 88–94, 98, 100, Mar. 1994, (Abstract only 1pp.).

Beiser K, "Getting "Grabby". Offline Web Browsing", Online, vol. 21, No. 2, pp. 20–22, 24–27, Mar. 1997, (Abstract only 1pp.).

Voigt K, "Reasoning About Changes and Uncertainty in Browser Customization", AI Applications in Knowledge Navigation and Retrieval, Papers from the 1995 AAAI Fall Symposium (Tech. Report FS–95–03), pp. 136–141, (Abstract only 1pp.).

Calcote J, "Thread Pools and Server Performance", Dr. Dobb's Journal, vol. 22, No. 7, pp. 60, 62–64, 86–89, Jul. 1997, (Abstract only 1pp.).

Gravano L. et al., "Merging Ranks from Heterogeneous Internet Sources", Proceedings of the Twenty–Third International Conference on Very Large Databases, pp. 196–205, Published: San Francisco, CA, USA, 1997, xvi+59 pp. (Abstract only 1pp.).

Liu Haiya et al, "A Multicontext Logic Used for Integrating heterogeneous Databases", Journal of Software, vol. No. 8, No. 9, pp. 687–693, Sep. 1997, (Abstract only 1pp.).

Binkley J. et al., "Rama: An Architecture for Internet Information Filtering", Journal of Intelligent Information Systems: Integrating Artificial Intelligence and Database Technologies, vol. 5, No. 2, pp. 81–99, Sep. 1995, (Abstract only 1pp.).

Kelehr P et al, "TreadMarks: Distributed Shared Memory on Standard Workstations and Operating Systems", Proceedings of the Winter 1994 USENIX Conference, pp. 115–132, Published: Berkeley, CA USA, 1994, 372.pp. (Abstract only 1pp.).

* cited by examiner

METHOD FOR ACCELERATED SORTING BASED ON DATA FORMAT

BACKGROUND OF THE INVENTION

1. Field of the Invention

This invention relates in general to sorting techniques, and in particular, to a method for accelerated sorting based on data format.

2. Description of Related Art

It is well known in the art to sort data for various reasons, and a number of different sorting methods are known. Consider, for example, the well-known treatise by Donald E. Knuth, entitled "The Art of Computer Programming, Volume 3, Searching and Sorting", Addison-Wesley Publishing Co., 1973. This treatise describes a number of different situations where sorting methods may be used, such as with lists, tables, trees, etc. It also describes a number of different sorting methods, such as quicksorts, merge sorts, etc.

It is not uncommon in the art for a first process to receive data from a second process and then sort the data before presenting it to a user. Unfortunately, the receiving process usually knows little about the received data, and thus tends to use the same sorting method, regardless of whether the received data is unsorted, partially sorted, or fully sorted. Obviously, this promotes sub-optimal performance, because the receiving process may spend unnecessary time in sorting data that does not need to be sorted.

What is needed then is a method for determining whether the data received by a process is either unsorted, partially sorted, or fully sorted, and selecting a sorting method (or not sorting) based on that determination. Such a method can result in substantial time savings and performance gains.

SUMMARY OF THE INVENTION

To overcome the limitations in the prior art described above, and to overcome other limitations that will become apparent upon reading and understanding the present specification, the present invention discloses a method, system, and article of manufacture for accelerated sorting based on data format, wherein the format is determined from known, derived, or empirical information indicating whether the data is an unordered format, in a partially ordered format, or in a fully ordered format, according to varying degrees of consistency or probability. Information used in making these determinations may include the receipt of an indicator from the sending process, the received data itself, a tracing or trending analysis performed on the received data, etc. Once a determination is made, more efficient sorting methods may be selected and used, or sorting may be avoided altogether.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The preferred embodiment of the present invention describes a Java™ applet (or other distributed client/server program or process) that is platform-independent, wherein the Java™ applet sorts and/or arranges data received from processes on other platforms. The Java™ applet accelerates the sorting of this data by taking advantage of consistent or probable known or derived characteristics of the data (e.g., its randomness or pre-sortedness).

Observations indicate that certain types of processes or processes executed on certain types of platforms consistently or usually transmit data in sorted order, while other types of processes or processes on other types of platforms consistently or usually transmit data in a random or pseudo-random order. Tests indicate that processing time can be reduced when the Java™ applet takes advantage of these observations, and uses different sorting methods for unsorted or partially sorted data, or uses no sorting for fully sorted data.

Accordingly, the Java™ applet determines whether some processes transmit partially or fully sorted data, and whether other processes transmit unsorted data, according to varying degrees of consistency or probability. Information used in making these determinations may include the receipt of an indicator from the sending process (e.g., indicating the platform used by the sending process, the type of sending process, the type of data transmitted by the sending process, the circumstances relating to the process, etc.), or the received data itself, or a tracing or trending analysis performed on the received data, or some other information. When such situations are recognized, the Java™ applet alters its processing, so that more efficient sorting methods are selected and used, or so that no sorting is performed.

Hardware and Software Environment

Figure 1:
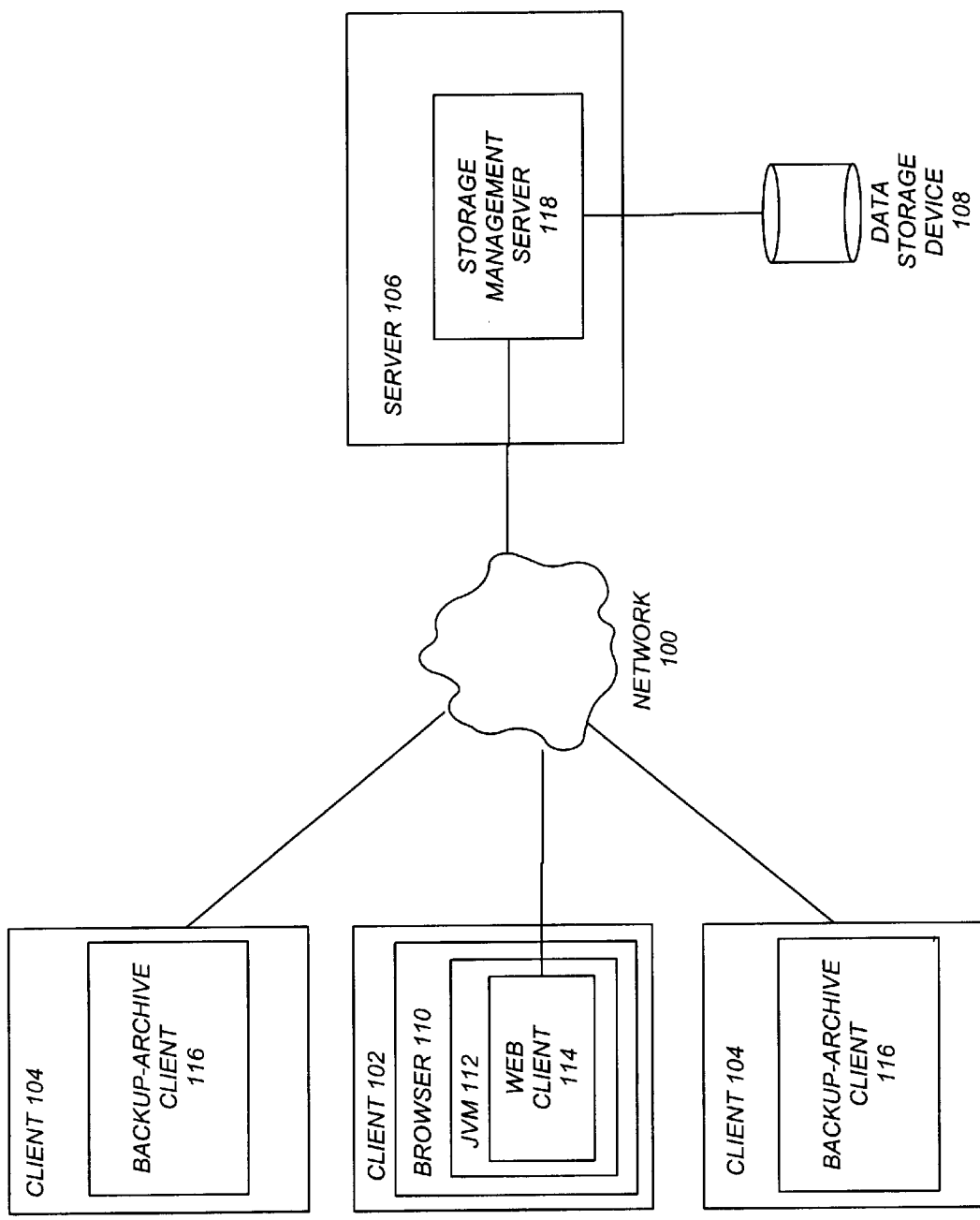
FIG. 1 is a block diagram that illustrates an exemplary client-server hardware and software environment of the preferred embodiment of the present invention.

FIG. 1 schematically illustrates an exemplary hardware and software environment that could be used in the preferred embodiment of the present invention, and more particularly, illustrates a typical distributed client/server environment using a network 100 to interconnect clients 102, clients 104, and servers 106 having one or more data storage devices 108. A typical combination of resources may include networks 100 that are LANs, WANs, SNA networks or the Internet, clients 102 and 104 that are personal computers, workstations or minicomputers, servers 106 that are personal computers, workstations, minicomputers or mainframes, and data storage devices 108 that are magnetic or optical disks, tape, memory, etc.

According to the preferred embodiment, client 102 executes a Web browser 110 having a Java™ Virtual Machine GVM) 112 that executes a Web Client 114. In the preferred embodiment, the Web Client 114 is a Java™ applet downloaded from a client 104 or server 106, although other programs could be used as well.

A user configures and monitors the system from the client 102 using the Web Client 114. The Web Client 114 collects data from Backup-Archive Clients 116 executed by one or more of the clients 104 in order to create a backup-archive job. The configuration and initiation of the backup-archive job is controlled by the user by means of the Web Client 114.

Once the Web Client 114 initiates the backup-archive job, the Backup-Archive Clients 116 backup, archive, restore, retrieve, recall, and/or migrate their files to and from a Storage Management Server 118 executed by the server 106. The Backup-Archive Clients 116 and Storage Management Server 118 manage the transfer of files and data from clients 104 to the server 106. The Storage Management Server 118 also determines how and where to store the transferred files and data on the data storage device 108. In addition, the Storage Management Server 118 offers Hierarchical Storage Management (HSM), which maximizes the usage of existing resources by transparently migrating the files and data to and from various data storage devices 108.

In general, the Web browser 110, JVM 112, Web Client 114, Backup-Archive Clients 116, and Storage Management Server 118 each are comprised of data and/or logic which, when read, interpreted, and/or executed by a computer, cause the computer to perform the steps for performing and/or using the present invention. Generally, the data and/or logic are embodied in and/or readable from a device, carrier or media, such as memory, data storage devices, and/or remote devices coupled to the computer via a data communications device.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass logic and/or data embodied in or accessible from any device, carrier, or media.

However, those skilled in the art will recognize that the exemplary environment and components illustrated in FIG. 1 are not intended to limit the present invention. Indeed, those skilled in the art will recognize that other alternative environments may be used without departing from the scope of the present invention.

Operation of the Preferred Embodiment

Java™ applets, such as the Web Client 114, are by nature platform-independent. Thus, the same Web Client 114 may be executed on and served from different hardware and/or operating systems platforms. In addition, the Web Client 114 of the preferred embodiment operates in a distributed, heterogeneous client/server environment, and thus may receive data from different versions of the Backup-Archive Clients 116 running on remote clients 104 having different hardware and/or operating systems.

For example, the Web Client 114 communicates with the Backup-Archive Clients 116 to perform backup-archive functions. When the user initiates the backup-archive functions, the Web Client 114 requests information on the file systems of the client 104 from the Backup-Archive Client 116. In response, the Backup-Archive Client 116 transmits specific data to the Web Client 114, which is then sorted and displayed for the user.

This data may comprise a list of file systems, a list of directories within one or more file systems, a list of files within one or more directories, etc. The sorting operations performed by the Web Client 114 on this data can be very expensive from a performance point of view. As a result, the Web Client 114 may spend an inordinate amount of time sorting data for display to the user, and the user may end up waiting a long time to see the sorted data.

In the prior art, the Web Client 114 would use only one sorting method, such as a quicksort, regardless of the format and degree of sortedness or randomness of the received data. However, this one sorting method generally performs well only for data in an unsorted order, and is sub-optimal for data in a partially or fully sorted order.

Depending on certain characteristics of the client 104, such as its operating system platform or the type of Backup-Archive Client 116, the received data may be in an unsorted order, in a partially sorted order, or in a fully sorted order when received by the Web Client 114. For example, a Backup-Archive Client 116 executing under the WINDOWS NT™ operating system on a client 104 transmits the data in a sorted order when the data comprises file names for files within a directory, although lists of file systems and directories are not transmitted in a sorted order. On the other hand, other Backup-Archive Clients 116 executing under other operating systems on other clients 104 may not even transmit file names for files in a sorted order. As a result, the Web Client 116 it would provide better performance if it used different sorting methods having different performance characteristics (or no sorting method) based on the format of the data received from the Backup-Archive Clients 116.

In the preferred embodiment, the Web Client 114 determines whether some Backup-Archive Clients 116 transmit partially or fully sorted data, and whether other Backup-Archive Clients 116 transmit unsorted data, according to varying degrees of consistency or probability. Information used in making these determinations may include the receipt of an indicator from the Backup-Archive Client 116 (e.g., indicating the type of platform used by the Backup-Archive Client 116, the type of Backup-Archive Client 116, the type of data transmitted by the Backup-Archive Client 116, etc.), or the received data itself, or a tracing or trending analysis performed on the received data, or some other information. When such situations are recognized, the Web Client 114 alters its selection of a sorting method, so that a more efficient method can be used in the case of unsorted or partially sorted data, or so that no sorting method is used in the case of fully sorted data.

In an alternative embodiment, the tracing or trending analysis could be performed by the Web Client 114 itself, including the maintenance of context information concerning this analysis. For example, if the Web Client 114 determines that data received from a particular Backup-Archive Client 116 has a high probability of being received in an unsorted order, a partially sorted order, or a fully sorted order, the Web Client 114 could alter its selection of a sorting method, so that a more efficient method is used or so that no sorting method is used.

Generally, a sorting method that is highly efficient for partially sorted data will be used in cases where it is observed that the data tends to be partially sorted. For example, a binary merge sort provides better performance for such data. On the other hand, a quicksort provides better performance for unsorted or random data than a merge sort. Further, the quicksort may be used as a default sorting method, when the type or format of data is not known.

Logic of the Preferred Embodiment

Figure 2:
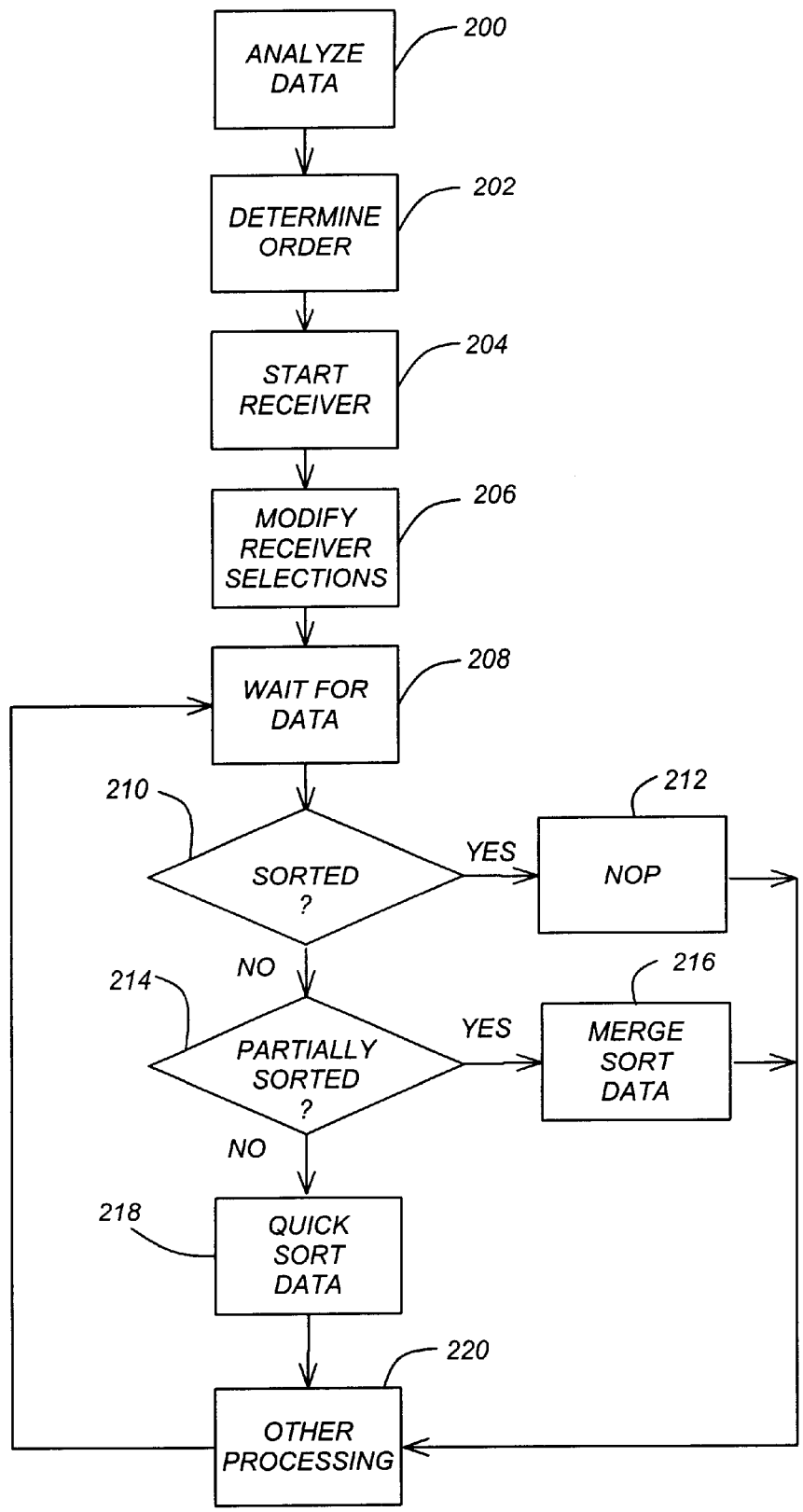
FIG. 2 is a flowchart that illustrates the logic performed by the preferred embodiment of the present invention.

FIG. 2 is a flowchart that illustrates the steps performed according to the preferred embodiment of the present invention. These steps need not be performed at the same time or in the specific sequence shown.

Block 200 represents a tracing, trending, or other empirical analysis being performed on the data transmitted by a sender process, e.g., for different sources, for different situations, for different types of data, and/or for different hardware or operating system platforms used by the sender process.

Block 202 represents a determination being made whether there are some situations where the data that is being transmitted from the sender process to the receiver process is consistently in an unsorted order, in a partially sorted order, or in a fully sorted order.

Block 204 represents the receiver process (i.e., the Web Client 114) being started on the client 102.

Block 206 represents a modification being made to the receiver process regarding the selection of sorting methods, after it has been determined that there are some situations where the data being transmitted from the sending process to the receiving process is consistently in an unsorted order, in a partially sorted order, or in a fully sorted order. This step ensures that an optimal sorting method is used for the different formats of data.

Block 208 represents the receiver process waiting for data from the sender process (i.e., the Backup-Archive Client 116).

Block 210 is a decision block that represents the receiver process determining whether the data is fully sorted. If the received data is fully sorted, control transfers to Block 212; otherwise, control transfers to Block 214.

Block 212 represents a NOP (no operation), which indicates that no sorting is necessary for fully sorted data. Thereafter, control transfers to Block 220.

Block 214 is a decision block that represents the receiver process determining whether the data is partially sorted. If the received data is partially sorted, control transfers to Block 216; otherwise, control transfers to Block 218.

Block 216 represents the receiver process performing a merge sort on the partially sorted data. Of course, those skilled in the art will recognize that this Block may represent any number of different sorting methods, according to the type of data, the amount of sorting necessary, etc. Once the sort is completed, control transfers to Block 220.

Block 218 represents the receiver process performing a quick sort on the unsorted data. Of course, those skilled in the art will recognize that this Block may represent any number of different sorting methods, according to the type of data, the amount of sorting necessary, etc. Once the sort is completed, control transfers to Block 220.

Block 220 represents the receiver process performing other processing, as required. Thereafter, control transfers back to Block 208.

CONCLUSION

This concludes the description of the preferred embodiment of the invention. The following describes some alternative embodiments for accomplishing the present invention. For example, any type of environment could be used to implement the present invention. In addition, the present invention is not limited to backup-archive systems, but could be used in any number of different applications.

In summary, the present invention discloses a method, system, and article of manufacture for accelerated sorting based on data format, wherein the format is determined from known, derived, or empirical characteristics indicating whether the data is an unordered format, in a partially ordered format, or in a fully ordered format. Information used in making these determinations may include the receipt of an indicator from the sending process (e.g., indicating the type of platform used by the sending process, the type of sending process, the type of data transmitted by the sending process, etc.), or the received data itself, or a tracing or trending analysis performed on the received data, or some other information. Once a determination is made, more efficient sorting methods are selected and used in the case of unsorted data or partially sorted data, or no sorting is performed in the case of fully sorted data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for accelerated sorting based on data format, comprising:
    (a) receiving data from a sender process at a receiver process;
    (b) determining at the receiver process whether the received data is in an unsorted format, a partially sorted format, or a fully sorted format;
    (c) processing the received data at the receiver process depending on the determination of whether the received data is an unsorted format, a partially sorted format, or a fully sorted format, wherein the processing step comprises: (1) sorting the received data according to a first sorting method when the received data is in an unsorted format, (2) sorting the received data according to a second sorting method when the received data is in a partially sorted format; and (3) not sorting the received data when the received data is in a fully sorted format.

2. The method of claim 1, wherein the receiver process comprises an applet that is platform-independent.

3. The method of claim 1, wherein the receiver process comprises a Web Client, the sender process comprises a Backup-Archive Client, and the received data is selected from information comprising: (1) an indicator from the sender process, (2) the received data itself, or (3) an analysis performed on the received data.

4. The method of claim 3, wherein the indicator is selected from a group of indicators comprising: (1) an indicator of a platform used by the sender process; (2) an indicator of a type of sender process; and (3) an indicator of a type of data transmitted by the sender process.

5. The method of claim 1, wherein the determining step comprises determining whether the received data is in an unsorted format, a partially sorted format, or a full sorted format based on known characteristics of the data.

6. The method of claim 1, wherein the determining step comprises determining whether the received data is in unsorted format, a partially sorted format, or a full sorted format based on derived characteristics of the data.

7. The method of claim 1, wherein the determining step comprises determining whether the received data is in an unsorted format, a partially sorted format, or a full sorted format based on empirical information.

8. The method of claim 1, wherein the empirical information is selected from a group of information comprising: (1) an indicator from the sender process, (2) the received data itself, or (3) an analysis performed on the received data.

9. The method of claim 8, wherein the indicator is selected from a group of indicators comprising: (1) an indicator of a platform used by the sender process; (2) an indicator of a type of sender process; and (3) an indicator of a type of data transmitted by the sender process.

10. The method of claim 1, wherein the first sorting method comprises a quicksort method.

11. The method of claim 1, wherein the second sorting method comprises a merge sort method.

12. An apparatus for accelerated sorting based on data format, comprising:

(a) a computer; and (b) a receiver process, performed by the computer, for receiving data from a sender process, for determining whether the received data is in an unsorted format, a partially sorted format, or a fully sorted format, and for processing the received data depending on the determination of whether the received data is an unsorted format, a partially sorted format, or a fully sorted format, wherein the processing comprises: (1) sorting the received data according to a first sorting method when the received data is in an unsorted format, (2) sorting the received data according to a second sort method when the received data is in a partially sorted format, and (3) not sorting the received data when the received data is in a fully sorted format.

13. The apparatus of claim 12, wherein the receiver process comprises an applet that is platform-independent.

14. The apparatus of claim 12, wherein the receiver process comprises a Web Client, the sender process comprises a Backup-Archive Client, and the received data is selected from information comprising: (1) an indicator from the sender process, (2) the received data itself, or (3) an analysis performed on the received data.

15. The apparatus of claim 14, wherein the indicator is selected from a group of indicators comprising: (1) an indicator of a platform used by the sender process; (2) an indicator of a type of sender process; and (3) an indicator of a type of data transmitted by the sender process.

16. The apparatus of claim 12, wherein the receiver process comprises means for determining whether the received data is in an unsorted format, a partially sorted format, or a full sorted format based on known characteristics of the data.

17. The apparatus of claim 12, wherein the receiver process comprises means for determining whether the received data is in an unsorted format, a partially sorted format, or a full sorted format based on detrived characteristics of the data.

18. The apparatus of claim 12, wherein the receiver process comprises means for determining whether the received data is in an unsorted format, a partially sorted format, or a full sorted format based on empirical information.

19. The apparatus of claim 12, wherein the empirical information is selected from a group of information comprising: (1) an indicator from the sender process, (2) the received data itself, or (3) an analysis performed on the received data.

20. The apparatus of claim 19, wherein the indicator is selected from a group of indicators comprising: (1) an indicator of a platform used by the sender process; (2) an indicator of a type of sender process; and (3) an indicator of a type of data transmitted by the sender process.

21. The apparatus of claim 12, wherein the first sorting method comprises a quicksort method.

22. The apparatus of claim 12, wherein the second sorting method comprises a merge sort method.

23. A article of manufacture embodying logic for accelerated sorting based on data format, the method comprising:

(a) receiving data from a sender process at a receiver process;

(b) determining at the receiver process whether the received data is in an unsorted format, a partially sorted format, or a fully sorted format;

(c) processing the received data at the receiver process depending on the determination of whether the received data is an unsorted format, a partially sorted format, or a fully sorted format, wherein the processing step comprises: (1) sorting the received data according to a first sorting method when the received data is in an unsorted format, (2) sorting the received data according to a second sorting method when the received data is in a partially sorted format; and (3) not sorting the received data when the received data is in a fully sorted format.

24. The method of claim 23, wherein the receiver process comprses an applet that is platform-independent.

25. The method of claim 23, wherein the receiver process comprises a Web Client, the sender process comprises a Backup-Archive Client, and the received data is selected from information comprising (1) an indicator from the sender process, (2) the received data itself, or (3) an analysis performed on the received data.

26. The method of claim 25, wherein the indicator is selected from a group of indicators comprising: (1) an indicator of a platform used by the sender process; (2) an indicator of a type of sender process; and (3) an indicator of a type of data transmitted by the sender process.

27. The method of claim 23, wherein the determining step comprises determining whether the received data is in an unsorted format, a partially sorted format, or a full sorted format based on known characteristics of the data.

28. The method of claim 23, wherein the determining step comprises determining whether the received data is in an unsorted format, a partially sorted format, or a full sorted format based on derived characteristics of the data.

29. The method of claim 23, wherein the determining step comprises determining whether the received data is in an unsorted format, a partially sorted format, or a full sorted format based on empirical information.

30. The method of claim 23, wherein the empirical information is selected from a group of information comprising: (1) an indicator from the sender process, (2) the received data itself, or (3) an analysis performed on the received data.

31. The method of claim 30, wherein the indicator is selected from a group of indicators comprising: (1) an indicator of a platform used by the sender process; (2) an indicator of a type of sender process; and (3) an indicator of a type of data transmitted by the sender process.

32. The method of claim 23, wherein the first sorting method comprises a quicksort method.

33. The method of claim 23, wherein the second sorting method comprises a merge sort method.

* * * * *

UNITED STATES PATENT AND TRADEMARK OFFICE
CERTIFICATE OF CORRECTION

PATENT NO. : 6,434,560 B1
DATED : August 31, 2002
INVENTOR(S) : Douglas Robert Case It is certified that error appears in the above-identified patent and that said Letters Patent is hereby corrected as shown below:

Column 7,
Line 41, detrived should read -- derived --

Signed and Sealed this

Tenth Day of June, 2003

JAMES E. ROGAN
*Director of the United States Patent and Trademark Office*